United States Patent [19]

Hammerschmitt

[11] 3,900,782

[45] Aug. 19, 1975

[54] SYSTEM FOR COMPENSATING FOR TEMPERATURE VARIATIONS IN A MAGNETIC DISC DRIVE

[75] Inventor: Peter Hammerschmitt, Anaheim, Calif.

[73] Assignee: BASF Aktiengesellschaft, Ludwigshafen (Rhine), Germany

[22] Filed: July 18, 1974

[21] Appl. No.: 489,692

[52] U.S. Cl. .......... 318/634
[51] Int. Cl. .......... G05d 23/275
[58] Field of Search .......... 318/634

[56] References Cited

UNITED STATES PATENTS

| | | | |
|---|---|---|---|
| 2,844,775 | 7/1958 | Miller et al. | 318/634 |
| 3,527,991 | 9/1970 | Sackin | 318/634 |
| 3,646,420 | 2/1972 | Halfhill et al. | 318/634 |
| 3,646,839 | 3/1972 | Shillam | 318/634 X |
| 3,757,189 | 9/1973 | Buchan et al. | 318/634 |
| 3,775,655 | 11/1973 | DuVall | 318/634 |

*Primary Examiner*—B. Dobeck
*Attorney, Agent, or Firm*—Johnston, Keil, Thompson & Shurtleff

[57] ABSTRACT

An improved means for compensating for temperature variations in a magnetic disc drive system in which a magnetic disc is rotated on a spindle and a magnetic head is movable radially across the surface of the disc by means of a head support displaceable on a base plate, the head and head support being positioned by a positioning means. A first temperature value is detected near the magnetic head and disc and a second temperature value is detected near the base plate and the positioning means. The differential between the first and second temperature values is obtained in the form of a first voltage signal and the differential between a constant reference temperature and the first temperature value is obtained in the form of a second voltage signal. The two voltage signals are summed to provide a correcting signal to the positioning means.

4 Claims, 5 Drawing Figures

SYSTEM FOR COMPENSATING FOR TEMPERATURE VARIATIONS IN A MAGNETIC DISC DRIVE

This invention relates to a system for compensating for temperature variations in a magnetic disc drive in which at least one magnetic head is allocated to each side of at least one magnetic disc, the magnetic disc being rotatable by means of a spindle rotatable in a baseplate and the magnetic head being movable radially across the side of the magnetic disc by means of a head support displaceable on the baseplate and the head and the head support being positioned by positioning means — a first temperature value being detected near the head and the magnetic disc and a second temperature value near the baseplate and the positioning means and the differential between the second and the first temperature values being applied to the positioning means, whereby the position of the head relative to the magnetic disc is controlled.

Disc memories of this type employ a movable head assembly in which the head is supported on an arm adjacent the surface of the magnetic disc. To enable a rectilinear movement to be performed in the direction of the disc radius, the arm is suitably supported on the displaceable head carrier. In this way, a head can be moved to any one of a large number of tracks. In order to achieve maximum storage capacity, the tracks should be arranged as closely together as possible on the disc surface. Thus, 200 tracks, for example, must be accommodated on a surface 1 inch (25.4 mm) wide. Obviously, this requires extremely accurate linear head positioning means. A further requirement is that the operating temperature in the region of the disc surface should be kept virtually constant, so as to keep dimensional variations of the disc to a minimum and thereby to avoid head positioning errors. If changes in the dimensions of the disc due to temperature variations occur, it is not possible to position the head accurately for the purpose of reading a track which has been recorded at a different temperature. Nor is it possible to position the head accurately relative to a track if the desired position of the head, the head support or the positioning means relative to the disc surface has been altered by temperature changes. In order to avoid such read errors, it has been suggested (U.S. Pat. No. 3,757,189) to detect the difference in the temperatures near the head and the associated disc zone on the one hand and near the baseplate, the head support and the positioning means on the other hand and to compensate for positioning errors by controlling the positioning means accordingly. This known method of temperature compensation presupposes that the temperature of the disc surface and the magnetic head can be detected with sufficient accuracy and speed. Using economically justifiable means, such measurements can only be made by detecting the temperature of the air current passing over the disc surface. Another prerequisite for the successful application of such a temperature compensation method is a constant ambient temperature controlled, for example, by an air-conditioning system.

The electronic circuits used for this known compensating method comprise several thermistors and a number of logic circuits.

An object of the present invention is to provide an improved temperature compensation method which is effective even when the ambient temperature in the magnetic disc drive varies.

It is another object of the present invention to ensure that temperature variations caused particularly by a disc pack change are compensated for very quickly, in order to avoid unnecessary dead times in write and read operations.

It is a further object of the present invention to also achieve fast-acting temperature compensation when the disc drive is switched on, again in order to avoid delays.

Yet another object of the invention is to provide simple circuit arrangements for carrying out the compensating method of the invention which will now be described in more detail.

According to the invention, a method is provided in which the temperature gradient between the first and the second temperature values is ascertained and applied to the positioning means as a controlled variable.

An advantageous circuit arrangement according to the invention consists essentially of a differentiating stage inserted between the thermistors and the electronic servo system of the positioning means.

In a preferred embodiment of the circuit arrangement of the invention, the differentiating stage comprises an RC-network and an amplifier.

In an advantageous embodiment of the invention, the differentiating stage comprises an electrolytic capacitor and a field effect transistor (FET).

Details of various embodiments of the invention will now be described with reference to the attached drawings.

Figure 1:
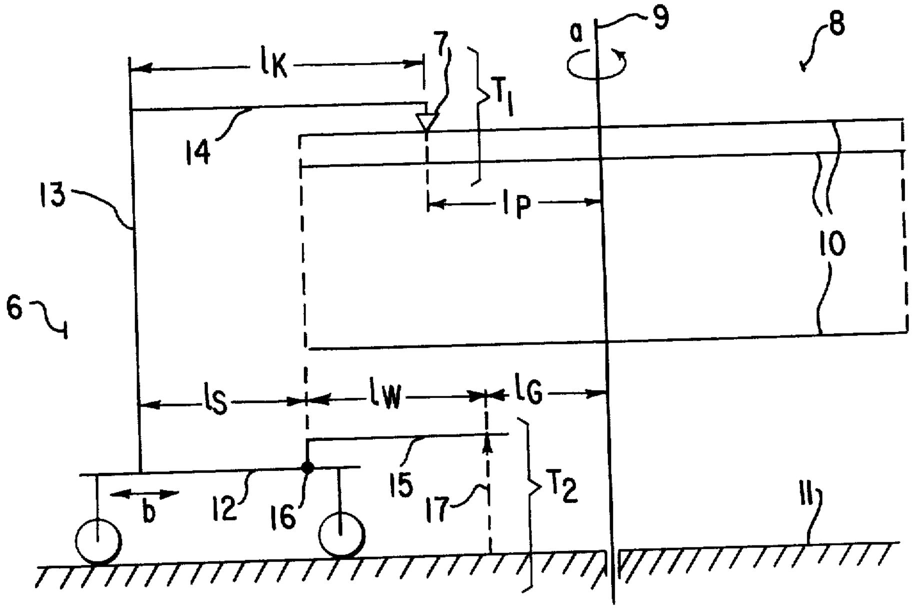
FIG. 1 is a diagrammatic representation of a disc pack, with a head carriage and a drive system (not shown)

I will now explain the state of the art with reference to the diagrammatic representation of FIG. 1.

To position the magnetic heads in a disc drive, there is required a positioning system by means of which a carriage 6 to which the magnetic heads are attached can be positioned and locked electrically.

A disc pack 8 is shown here in the form of a rotating spindle 9 and two magnetic discs 10 rigidly attached thereto. The spindle 9 is rotatably mounted in a baseplate 11. The head-supporting carriage 6 consists of the carriage 12 proper and the head tower 13 mounted thereon and supporting by means of arms 14 a number of magnetic heads corresponding to the number of magnetic-disc sides. Only one head 7 is shown in the drawing.

The positioning system may operate optically or magnetoelectrically. For disc files with a high track density, the more economical optical positioning system is being used to an increasing extent.

The lengths $l_K$, $l_S$ and $l_E$ have fixed values, whereas the lengths $l_P$ and $l_W$ are variable distances of the momentary magnetic-head position (also referred to as the "cylinder position").

$l_K$ is the distance between the head 7 and the head tower 13;

$l_S$ is the effective length of the carriage 6;

$l_G$ is the effective length of the baseplate 11, measured from the spindle 9;

$l_P$ is the momentary radius of the magnetic disc 10; and $l_W$ is the momentary distance of the positioning means 15 from a reference position 17 for the head position on the disc 10.

The positioning means 15 is attached to the carriage 6 at point 16.

Positioning problems are caused in a system of this kind by the different coefficients of expansion of the materials employed and the different temperatures T1 and T2 of (a) the baseplate 11 and the positioning means 15 and (b) the magnetic disc 10, the magnetic head 7 and the arm 14 respectively.

By appropriate choice of the point 16 at which the positioning means 15 is fastened it is possible to ensure that a chosen position of the magnetic head 7 remains constant for all stable operating temperatures. At this point 16, the sum of all expansions equals zero, whereas this sum would be negative to the left and positive to the right of this point 16. The momentary disc radius at this point 16 equals $l_{PR}$. Therefore, the effective length $l_{PW}$ of the disc 10 which results in an increase or decrease in length is calculated as follows:

$$l_{PW} = (N - X)S$$

wherein

- N is the number of tracks (cylinder number) for which the sum of expansions equals zero,
- X is the number of tracks (cylinder number) corresponding to the momentary position of the head and
- S is the width of the track.

The same equation applies to the effective length $l_{WW}$ of the positioning means 15, namely $$l_{WW} = (N - X)S.$$

When calculating the resultant expansion it must be assumed that at a given temperature $T_{ref\,1} = T1$ and $T_{ref\,2} = T2$ the positioning system works accurately, no matter to which cylinder number the head is to be moved. Furthermore, in a memory unit having a stable temperature the difference $\Delta T = T2 - T1$ is constant, irrespective of the ambient temperature. Therefore, $T2 - T_{ref\,2} = T1 - T_{ref\,1}$. Under these conditions, the effective expansion may be calculated with $\alpha_p$ being the coefficient of expansion for the magnetic disc 10 and $\alpha_W$ the coefficient of expansion for the positioning means 15.

$$\Delta l_{PW} = \alpha_p \times (N-X)\,(T2 - T_{ref\,2}) = \alpha_p(N-X)\,(T1 - T_{ref\,1})$$

and $$l_{WW} = \alpha_W \times (N-X)\,(T1 - T_{ref\,1})$$

For the deviation of the magnetic head 7 from the desired position in a memory unit having a stable temperature we obtain, at the temperature T1 of the baseplate 11, $$\Delta l_W = \Delta l_{PW} - \Delta l_{WW} = (\alpha_p - \alpha_W)\,(N-X)\,(T1 - T_{ref\,1}).$$

The foregoing deliberations and calculations presuppose a system having a stable temperature in a room having a stable temperature. This would mean $T2 - T1 = \Delta T =$ constant.

Where variations in the ambient temperature occur as the result of a disc pack change and as the result of the unit being switched on, this presumption no longer applies. In this case, expansion can no longer be calculated on the basis of the effective length $l_{PW}$ and $l_{WW}$, but the momentary length $l_P$ of the disc must be taken into consideration.

Thus, the momentary length of the disc 10 is $$l_P = l_{PR} + (N-X)S$$

and the resultant expansion is $$\Delta l_P = \alpha_P \times [l_{PR} + (N-X)S] \times (T2 - T1 - \Delta T)$$

wherein $l_{PR}$ is the disc radius at which the sum of the expansions equals zero, at any stable operating temperature.

It is likewise necessary to take into consideration the thermal expansion of the arm 14. It is $$\Delta l_K = \alpha_K \times l_K \times (T2 - T1 - \Delta T).$$

If all these expansions are added together, we obtain the total deviation ΔX of the magnetic-head position from the desired position X, namely $$\Delta X = (T1 - T_{ref\,1})\,(\alpha_p - \alpha_W)\,(N-X)S + (T2 - T1 - \Delta T) \times \alpha_P \times [\,l_{PR} + \frac{\alpha_K}{\alpha_P} \times l_K + (N-X)S].$$

The purpose of this temperature compensation is to correct deviation ΔX, either by mechanical means or electrically, the individual components making up ΔX being generated electrically and fed to the servo system which positions the head by displacing the carriage 12, as a supplementary command W in the form of a temperature-compensating voltage.

Figure 2:
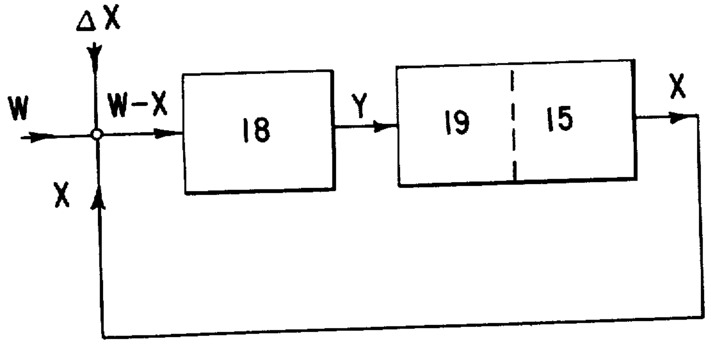
FIG. 2 is the schematic of the controlled system for temperature compensation of the disc pack.

A diagrammatic representation of such a control loop appears in FIG. 2. The reference numeral 18 denotes a controller, 19 the controlled system and Y the output signal of the controller 18.

Figure 3:
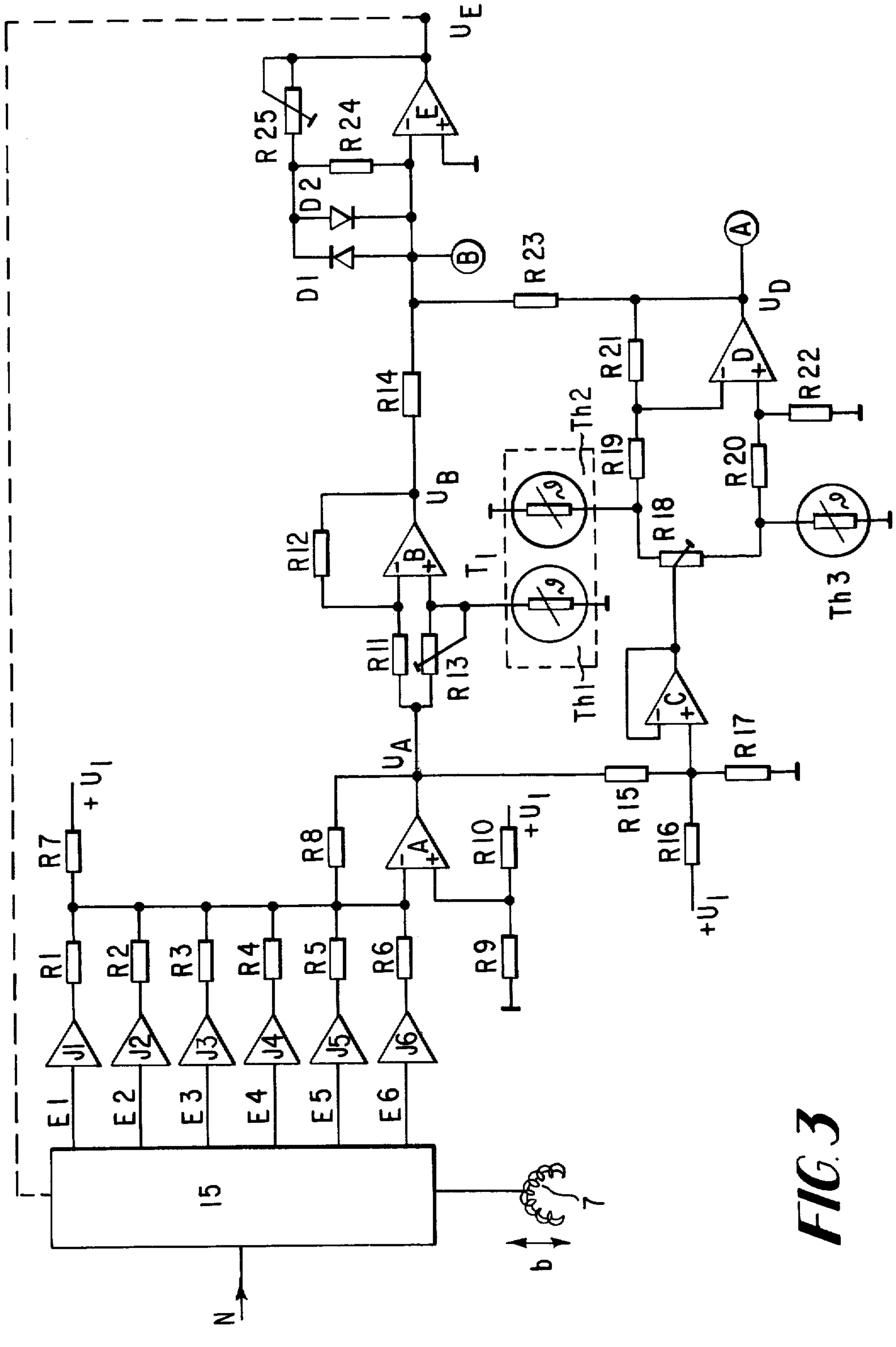
FIG. 3 shows a possible compensating circuit according to the state of the art.

A circuit diagram for an electric temperature compensating system is shown in FIG. 3.

The expression (N−X)S is simulated by the operational amplifier A which acts as a D/A-converter.

Inverters I1 to I6, switching relative to 0 V, and resistors R1 to R6 are used for weighting the digital signals E1 to E6, supplied by the positioning system 15 and representing the momentary (cylinder) position. The resistors R7 to R10 determine the existing output $U_A$ of the D/A-converter A, which output voltage $U_A$ equals 0 V when X equals N, i.e. when the momentary (cylinder) position equals the cylinder number N. The signal representing the given cylinder number N is supplied by an address register (not shown) of the memory unit and is applied to the positioning system 15. The expression $(T1 - T_{ref\,1})$ is simulated by an operational amplifier B. A thermistor T*h* 1 is part of a bridge circuit comprising the resistors R11 – R13. Thermistor T*h* 1 measures the temperature T1 of the baseplate 11, in conjunction with a further thermistor T*h* 2. The output voltage UB of the amplifier B is set to 0 V by means of the resistor R13 if T1 equals $T_{ref\,1}$. By means of a resistor R14, the constant difference in the temperature coefficients $(\alpha_P - \alpha_W)$ can be simulated. The expression $$[\,l_{PR} + \frac{\alpha_K}{\alpha_P} \times l_K + (N-X)S]$$

is simulated by the resistors R15 to R17 and can be decoupled by means of an operational amplifier C.

The expression (T2 − T1 − ΔT) is simulated by means of the thermistors T$h$2 and T$h$3 which, together with R18 to R22 and an operational amplifier D, form a bridge circuit. For $T2 - T1 = \Delta T$ (the condition of a temperature-stabilized memory unit), the output voltage $U_D$ is set to 0 V by means of R18. The coefficient $\alpha_P$ is reflected by the resistor R23.

The temperature-correcting voltage $U_E$, which is applied to the positioning system 15, appears at the output of an operational amplifier E as the weighted sum of the input values. The voltage $U_E$ is limited by diodes D1 and D2 in anti-parallel configuration in such a way that the influence of $U_E$ upon the positioning system 15 is always smaller than the voltage supplied by the positioning system, because otherwise the carriage 12 could no longer be blocked.

The weighting of the temperature-correcting voltage $U_E$ is obtained by means of a resistor R25 by feeding a predetermined signal corresponding to a value N to the positioning system 15, which signal corresponds to a precisely defined displacement of the magnetic head 7. This setting is customarily carried out with the aid of a calibrating disc pack, a so-called CE pack.

The positioning system 15 comprises electronic circuits for storing the input signals N, for determining the actual head position X, for comparing the signal values N and X, and other necessary servo units.

In the above description of the temperature compensation system it has been assumed that the thermistor T$h$3 is capable of measuring the temperature T2 of the magnetic disc 10 and the arm 14 with sufficient accuracy and speed. However, when using economically justifiable means, this measurement can only be carried out in practice by detecting the temperature of the air passing over the disc surface. For normal requirements with regard to accuracy, this measuring method, in conjunction with the above-described electronic temperature-compensating system, will prove adequate if the disc drive system operates in an environment in which temperature is controlled by an air-conditioning system for example, and if the unit, after a disc pack change or after having been switched on, does not have to be ready for operation until a few minutes have elapsed.

According to the present invention it has been found that, for the purpose of directly taking into account the temperature gradient $$\frac{\Delta X}{\Delta Z},$$

it is advantageous to add a term to the equation for ΔX (see above). This is done by differentiating the temperature gradient $\Delta T = T2 - T1$, measured by the thermistors T$h$2 and T$h$3.

The above equation for ΔX is now written as follows:

$$\Delta X = (T1 - T_{ref\,1})\,(\alpha_P - \alpha_W)\,(N-X)S + [(T2 - T1 - \Delta T) + K$$

$$\frac{\alpha(T2 - T1 - \alpha T)}{dt}\,]\times \alpha_P\,[1_{PR} + \frac{\alpha_K}{\alpha_P}\times 1_K + (N-X)S].$$

Figure 4:
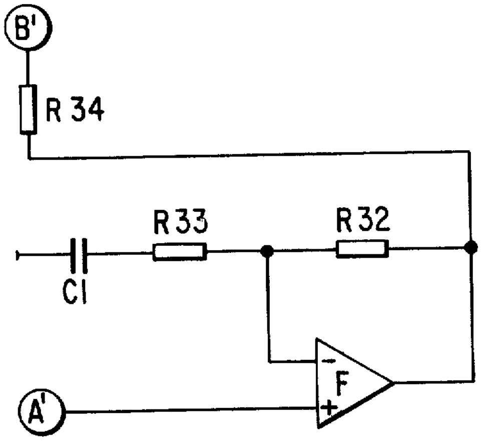
FIG. 4 shows a supplementary circuit according to the present invention, to be associated with the circuit arrangement of FIG. 3.

The electrical simulation of this term of the equation is shown diagrammatically in FIG. 4. An advantageous circuit arrangement is shown in detail in FIG. 5.

The output voltage $U_D$ of an operational amplifier D is applied to the non-inverting input of an amplifier F which, in static operation, develops a gain H. As the voltage $U_D$ varies, the arrangement R32, R33, C acts as a potential divider which limits the gain of amplifier F for fast variations to a maximum of $$V = \frac{R32 + R34}{R33}$$

The differentiation time constant $\tau_D$ equals C1 × (R32 + R33). The resistor R34 permits the weighting of the output voltage $U_F$. The dimensioning of the time constant $\tau_D$ is advantageously ascertained empirically because it depends directly upon the position of the thermistor T$h$3 and the volume of air blown through the disc pack 8 per unit time.

Since time constants larger than one minute are required in realizing the supplementary temperature gradient circuit, it is advantageous to use an electrolytic capacitor C1, preferably a tantalum capacitor, if it is desired to keep the values of resistors R32 and R33 low. The employment of a polarized capacitor is obviously not indicated in a circuit such as shown in FIG. 4, because the potential in A may either become positive or negative. For this reason a supply voltage $+U_1$ is applied to the anode of the electrolytic capacitor which, as has already been explained, is higher than the most positive potential in point A. This would mean, however, that the cathode of the electrolytic capacitor would likewise assume the potential $+U_1$ when the unit is switched on, and this would delay the desired function of the circuit arrangement for some time. To avoid this, the gate of the field effect transistor T3 is temporarily charged to the potential $+U_1$ via capacitor C2 when the unit is switched on, and the said transistor is thus turned on and charges the cathode of the capacitor C1 to the same potential as in point A. A resistor R27 prevents the gate current to T3 from rising too high when the unit is switched on. After a short time the cathode of capacitor C2 is charged via a resistor R28 to the potenetial $-U_2$ which blocks transistor T3 and prepares the circuit for operation. When the unit is switched off, capacitor C2 discharges through diode D3, so that the field effect transistor T3 is enabled to conduct current again if the unit is switched on again immediately.

The resistor R26 has the same value as R32 and adjusts the current biassing the amplifier F.

Figure 5:
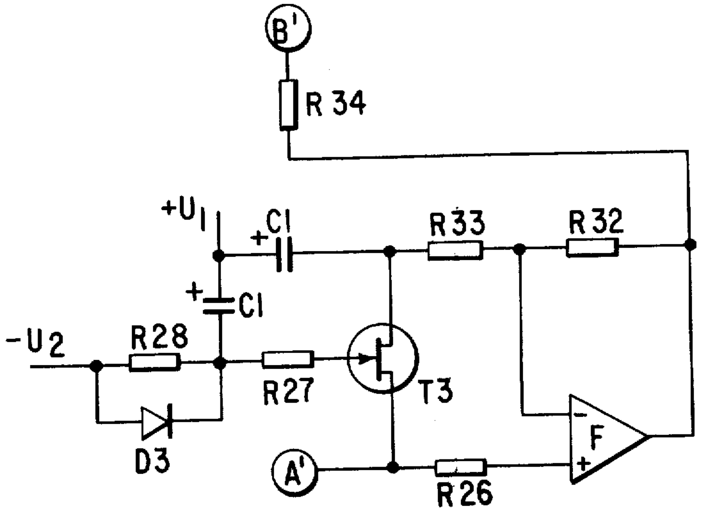
FIG. 5 shows an improved embodiment of the supplementary circuit of FIG. 4.

It is clear from the above explanation that the circuit arrangement of FIG. 5 is a very advantageous embodiment of the present invention. Other circuit arrangements which also come within the scope of protection of the following claims are conceivable.

The supplementary temperature compensation circuit arrangement shown in FIG. 5 has proved to be outstandingly effective in the field and has enabled head positioning errors attributable to the effects of temperature to be reduced to at most 10%, so that a very substantial improvement over conventional compensating methods and circuit arrangements is achieved.

I claim:

1. In a disc drive system of the type having a movable head which is servoed to the desired track in accordance with a scale located in an evironment which is likely to have a different temperature $T_1$ than the temperature $T_2$ of the disc and head arm, and comprising means for generating a first voltage proportional to the track position and the temperature differential between $T_1$ and $T_2$; means for generating a second voltage proportional to track position and the temperature differential between $T_1$ and a reference temperature $T_3$; and means for summing said first and second voltages together to provide a correcting signal to said servo whereby said head may be accurately positioned to the desired track irrespective of overall temperature variations or differences in the temperatures $T_1$ and $T_2$, the improvement which comprises means for generating a third voltage proportional to the temperature gradient between the temperatures $T_2$ and $T_1$ and means for feeding the third voltage as an additional control voltage to said servo.

2. A disc drive system according to claim 1, wherein the means for generating and feeding the control voltage consists essentially of a differentiating stage inserted between the means for generating the second voltage and the servo.

3. A disc drive system according to claim 2, wherein the differentiating stage includes an RC-network and an amplifier.

4. A disc drive system according to claim 2, wherein the differentiating stage includes a field effect transistor, an electrolytic capacitor and a resistor as RC-network.

* * * * *